R. O. HUGHES.
BUTTER CUTTING MACHINE.
APPLICATION FILED APR. 12, 1909.

1,007,357.

Patented Oct. 31, 1911.
5 SHEETS—SHEET 1.

Witnesses
H. C. Robinette

Inventor
Robert O. Hughes
By Meyers, Cushman & Rea
Attorney

R. O. HUGHES.
BUTTER CUTTING MACHINE.
APPLICATION FILED APR. 12, 1909.

1,007,357.

Patented Oct. 31, 1911.
5 SHEETS—SHEET 3.

Witnesses

Inventor
Robert O. Hughes
By Meyers, Cushman & Rea
Attorney

R. O. HUGHES.
BUTTER CUTTING MACHINE.
APPLICATION FILED APR. 12, 1909.

1,007,357.

Patented Oct. 31, 1911.
5 SHEETS—SHEET 4.

Inventor
Robert O. Hughes

Witnesses

By Meyers, Cushman & Rea
Attorney

R. O. HUGHES.
BUTTER CUTTING MACHINE.
APPLICATION FILED APR. 12, 1909.

1,007,357.

Patented Oct. 31, 1911.

Inventor
Robert O. Hughes

Witnesses

By Meyers, Cushman & Rea
Attorney

UNITED STATES PATENT OFFICE.

ROBERT O. HUGHES, OF MANKATO, MINNESOTA, ASSIGNOR OF ONE-HALF TO BENNETT WILLIAMS, OF MANKATO, MINNESOTA.

BUTTER-CUTTING MACHINE.

1,007,357.  Specification of Letters Patent. Patented Oct. 31, 1911.

Application filed April 12, 1909. Serial No. 489,463.

*To all whom it may concern:*

Be it known that I, ROBERT O. HUGHES, a citizen of the United States, residing at Mankato, in the county of Blue Earth and State of Minnesota, have invented new and useful Improvements in Butter-Cutting Machines, of which the following is a specification.

This invention relates to that class of machines designed particularly for cutting and wrapping butter. It should be evident that the machine may be used for the purpose of cutting and packaging any plastic composition.

The object of the invention is to produce such a machine which will perform the operations incident to the packaging of the commodity desired in a neat, rapid and efficient manner, the machine being especially designed to obtain these features. At the same time I have aimed to provide a machine which is light and whose cost of manufacture is not excessive, but is well within reach of all dairymen and manufacturers.

The details of the cutting mechanism, together with the modifications of the same will be accurately described in the specification following, and the scope of the invention in its relation to the art to which it pertains accurately defined in the annexed claims.

Figure 1:
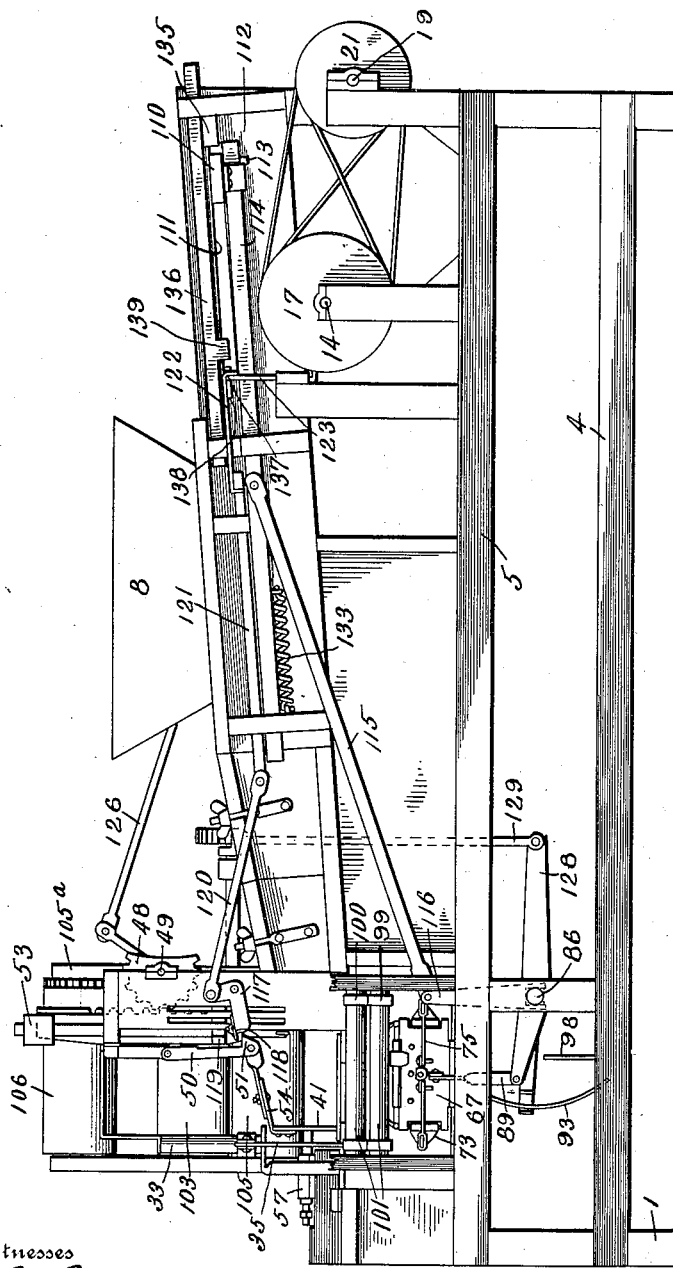
Figure 2:
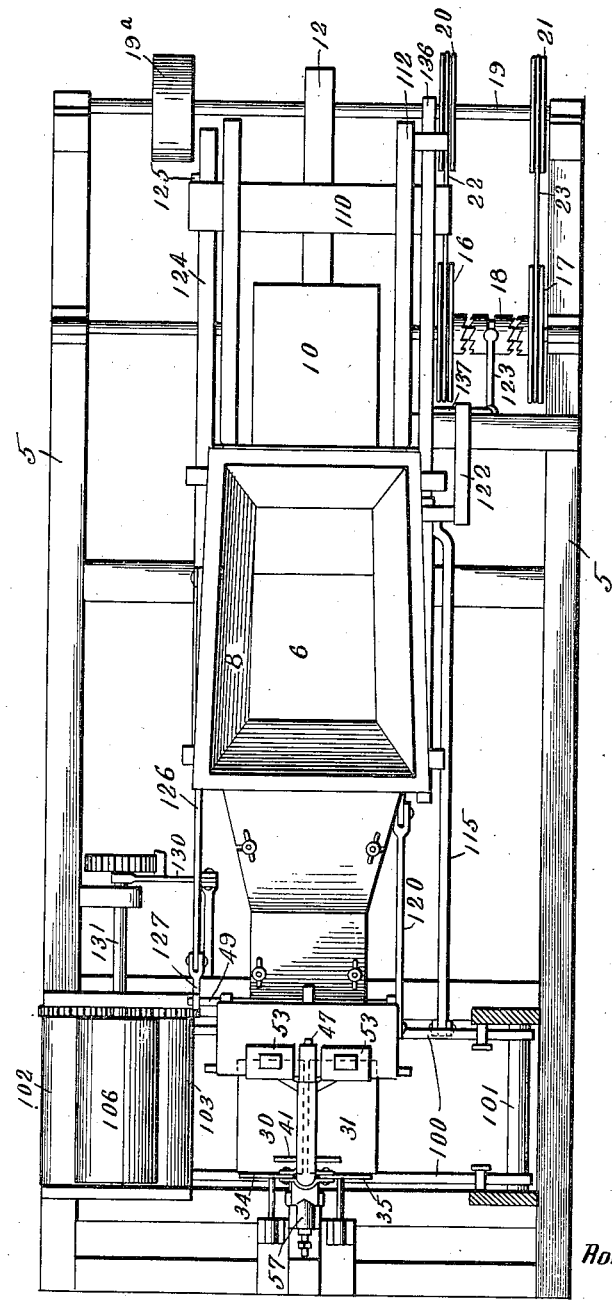
Figure 3:
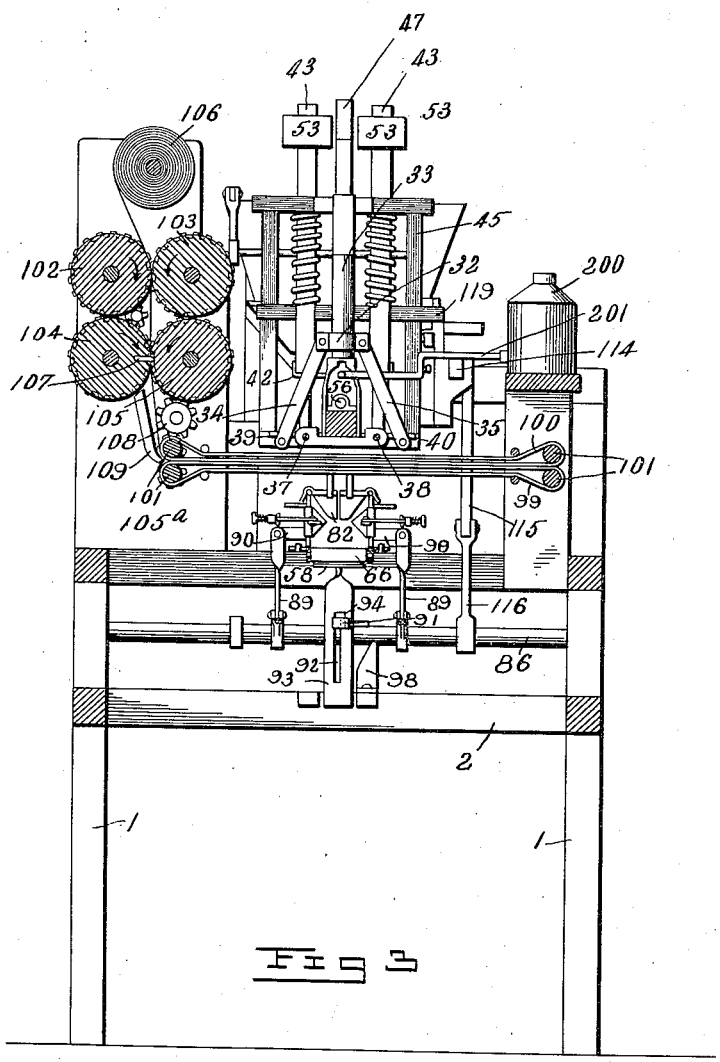
Figure 4:
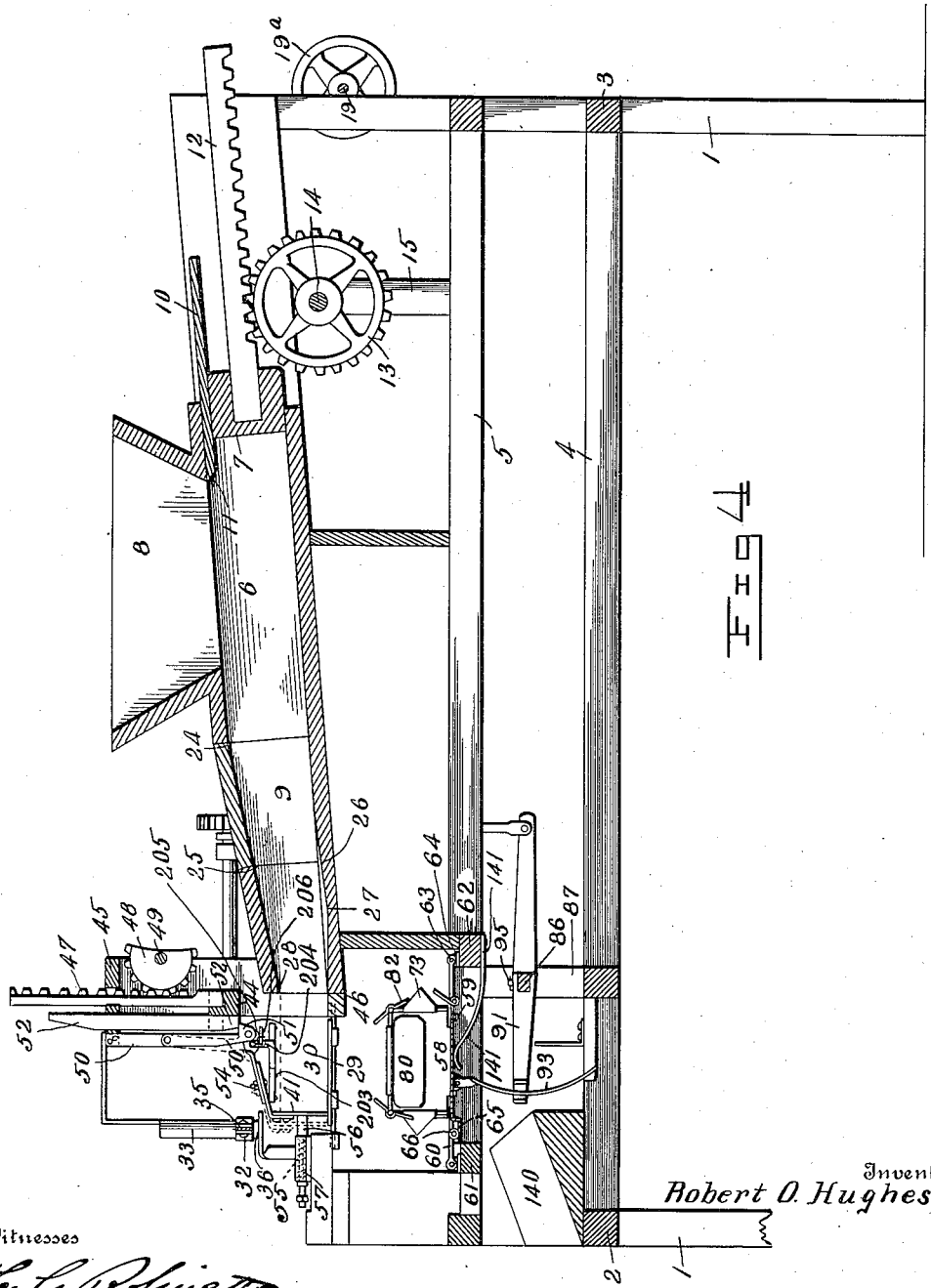
Figure 5:
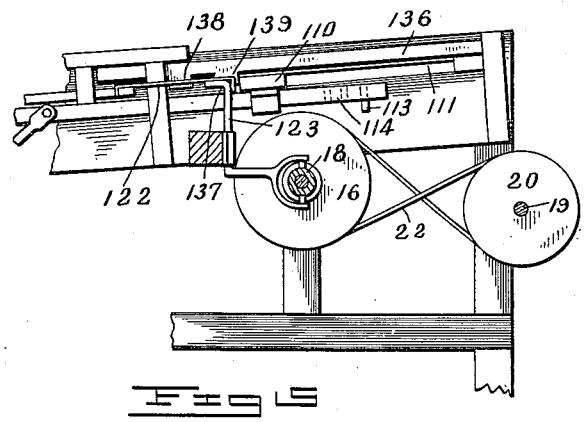
Figure 6:
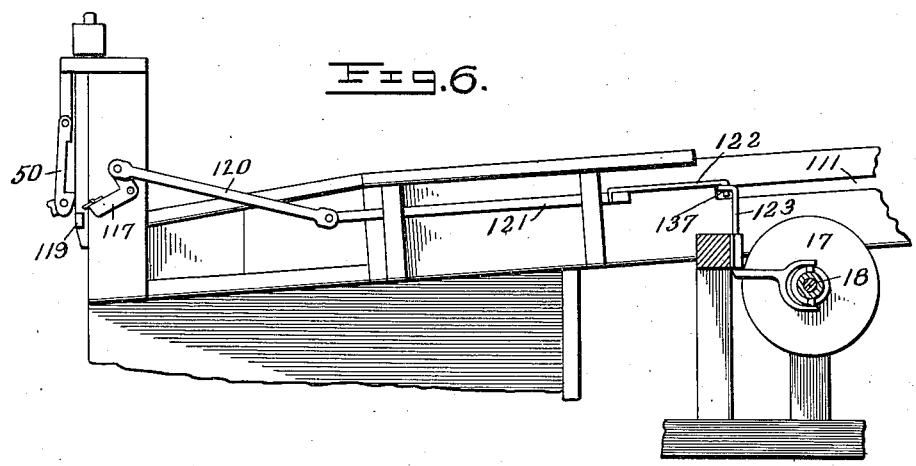

In the accompanying drawings,—Figure 1 is an elevation of the machine. Fig. 2 is a plan view of the machine. Fig. 3 is an end view with certain parts broken away to show the relation of the mechanisms to each other. Fig. 4 is a sectional elevation with certain parts omitted for the sake of clearness. Fig. 5 is a detail showing the operation of the reversing device used in connection with the block forming mechanism. Fig. 6 is a detail showing the reversing device in another of its relations to the block forming mechanism.

The main frame of the machine on which the three inter-related mechanisms are mounted is formed of four uprights 1, interconnected by end beams 2 and 3 and side beams 4 and 5. The uprights 1 at that end of the frame supporting the wrapping mechanism are shorter than the corresponding uprights at the opposite end of the frame.

Mounted centrally and longitudinally of the frame is a charge or block forming device comprising a chamber 6 provided with a piston 7 for feeding the butter forward, a hopper 8 for holding the butter, and a chute 9 for forming and delivering the charge to the wrapping mechanism. The piston 7 as well as the rectangular chamber 6 within which it is adapted to reciprocate is rectangular, and is provided on its upper side with a knife board 10 for confining the charge which enters the chamber from the hopper above to the chamber during the forward movement of the piston. The forward end of this knife board 11 is beveled on its under side and projects slightly in front of the forward end of the piston 7 in order to better confine the material to the chamber and prevent its being forced back into the hopper. The sharp beveled edge of this board makes a clean division between the material in the hopper and that within the chamber.

The piston 7 is provided with a rearwardly extending rod 12 which has rack teeth formed thereon, and meshing with the teeth of a gear 13 on a transverse shaft 14 mounted on uprights 15 on the frame of the machine. This shaft 14 has freely mounted thereon two pulleys 16 and 17 respectively, and each adapted to be engaged by a clutch member 18 splined on the shaft between them. A transverse driving shaft 19 provided with a driving pulley 19ª is mounted on the uprights 1 at this end of the machine and through pulleys 20 and 21 and direct and cross belts 22 and 23 drives the pulleys 16 and 17. By this mechanism when the clutch 18 is in engagement with the pulley 16 the piston 7 is forced forward and when the clutch member 18 is in engagement with the pulley 17 the piston is drawn backward to admit a fresh charge to the chamber 6.

As the piston 7 moves forward the material within the chamber is forced into the forming and delivery chute 9. This chute between the points 24 and 25 is provided with converging upper, lower and lateral walls, as clearly appears from an inspection of Figs. 1 and 2. At the point 26 the lower wall is cut-away in such a manner that the inner surface converges toward the upper surface at a lesser angle, or it may run parallel to it. From point 27 to the end of the chute the lower surface is approximately horizontal. The inner surface of the upper wall of the chute is a continuous plane surface until it reaches the very mouth of the chute when it is beveled off for a short distance as at the point 28. It will be noted that the convergence of the lateral walls of the chute is much greater than the convergence of the upper and lower walls. This construction of the chute insures entrained water or moisture within the butter being retained, in that the principal compression takes place laterally by reason of the greater convergence of the lateral walls and there is some room for the charge to spread in a vertical direction while it is under formation due to the peculiar slope of the inner surface of the lower wall at 26 and 27 just described. The lateral walls of the chute between the point 25 and the end are practically parallel although they may converge slightly.

A charge of butter forced from the end of the chute by the final forward movement of the piston moves out over and rests upon a table 29 formed of two pivotally mounted plates 30 and 31. These plates normally occupy a horizontal plane, being so balanced that they assume this position by virtue of the action of gravity whenever they are thrown from it and released. They are connected with a collar 32 slidably mounted on a stud 33 attached to a fixed part of the machine by links 34 and 35 respectively. The collar 32 when in its lowest position against the abutment 36 determines the horizontal position of the plates. The plates 30 and 31 are pivoted at points 37 and 38 and are suitably weighted on their outer edges 39 and 40 to obtain the action just described. As the nearly completed block moves out from these plates it strikes the abutment plate 41 which controls, through a suitable latch, a device for cutting off the block from the butter remaining within the chute. This device consists of a cutting wire 42 stretched between two rods 43 rigidly connected to a cross head 44 adapted to be reciprocated in a frame-work 45 which rises from the transverse beam 46 of the frame of the machine. A rack bar 47 is also connected to this cross head 44 and meshing with which is a segmental gear 48 mounted on a cross shaft 49 carried by the frame 45. A latch 50 pivoted to the upper part of frame 45 normally engages with its hooked end 51 the under side of the cam member 52 attached to the cross head 44 and holds the cross head 44 and the attached cutting wire 42 in a raised position while weights 53 on the upper ends of the rods 43 tend to force the cross head and cutting wire downward across the path of the butter being forced from the chute. A link 54 connects the member 41 with the hinged latch 50 in such a manner that when the end of the charge being formed strikes the abutment plate 41 the latch is caused to take the dotted line position of Fig. 4, and the weights 53 impel the cross head and cutting wire downward to cut off the charge. The plate 41 is spring pressed to its full line position in Fig. 4 by a spiral spring 55 surrounding its supporting rod 56 passing through the lug 57 attached to the frame of the machine.

Mounted on one side of frame 55 which carries the device for cutting off the charge is a bell crank lever 117 provided at its one end with a spring pressed latch 118 which opens upwardly and projects into the path of an arm 119 attached to the cross head of the cutting device in such a manner that upon downward stroke of the cutting device the bell crank lever is turned counter-clockwise and upon the upward stroke of the device the arm 119 lifts the latch 118 and does not affect the lever 117. The opposite end of the bell crank lever 117 is connected by a link 120 with a rod 121 slidably mounted on the same side of the frame 112 as the rod 114, and connected at its opposite end by link 122 and bell crank lever 123 journaled on the frame of the machine to the clutch member 18 between the pulleys 16 and 17 on the shaft 14. The end of the bell crank lever 123 connecting with the link 122 lies directly in the path of the cross head 110. On the opposite side of the frame 112 is a slidably mounted rod 124 provided with a projection 125 adapted to be engaged by cross head 110 at its extreme outward position, and connected at its opposite end by a link 126 to the crank 127 of shaft 49 carrying the segmental gear 48 which operates the cross head 44. Shaft 86 is provided with still another arm 128 which through a link 129 and ratchet and pawl 130 operates the paper feeding rollers 102 to 105, the ratchet 130 being mounted on shaft 131 on which is mounted the pinion 132 which drives the paper feeding mechanism.

Assuming that the hopper 8 and the chamber 6 are full of butter or other material to be packaged and that the piston 7 is in the rearward position shown in Fig. 4, the operation of the machine will now be described. The piston being in its rearward position the cross head 110 acting on projection 113 on rod 111 has oscillated shaft 86 in a clockwise direction to close the wrapping box beneath the table 29, and the table 20 is in its horizontal position. The cross head 110 has also engaged projection 125 on rod 124 on the opposite side of the frame 112 and operated the shaft 49 to raise the cross head 44 in a position to be caught and latched by latch 50 which is pressed forward by reason of the spring 55 behind the member 41. By reason of the oscillation of shaft 86 the paper feeding mechanism has been actuated and a sheet of paper lies in a horizontal plane directly above the wrapping box and between it and the table 29.

By throwing the clutch 18 into engagement with pulley 17 the piston is started forward compressing the butter within the chamber 6 before it and cutting off the butter within the chamber from that within the hopper by virtue of the knife board 11. The compressed butter is forced down and through the chute 9, retaining its water by virtue of the peculiar configuration of the chute, and is exuded from the mouth of the chute over the table 29 until it strikes the abutment plate 41 controlling latch 51. The end of the bar of butter forces plate 41 from the full line to the dotted line position, and releases latch 50 allowing the cross head 44 to be forced down by the weights 53, the wire 42 cutting off a block of butter just beyond the mouth of the chute. At the same time this operation takes place, the cam 52 engages the end of the latch 51 and forces plate 41 still farther away from the end of the block, thus allowing the full weight of the block to rest upon the table 29. Immediately the two wings 30 and 31 of the table collapse centrally, assuming a vertical position, and allowing the block of butter to drop between them into the open wrapping box or other receptacle below. The piston 7 having forced another charge out upon the table 29, the operation of the machine thus described is repeated and may be carried on as long as desired.

In packaging butter by the use of this machine, I find it very advantageous to wet the block of butter just before the paper is placed around it. To this end, I mount on the frame of the machine a tank 200 for holding water. From this tank leads a pipe 201 to a point immediately over the table 30. The end of this pipe extends longitudinally and centrally of the table, and is provided with four outlets 203 in a position to discharge water upon the top of a block of butter cut from the mouth of the chute. In the pipe 201 is placed a valve 204 normally held closed by the pressure exerted by spring 205, but adapted to be opened by the engagement of valve lever 206 with projection 119 from the cross head 44 of the butter cutting mechanism. Thus the valve is opened to moisten each block of butter cut from the mouth of the chute, but is closed almost immediately thereafter upon the return of the butter cutting mechanism to its normal position, the spring 205 closing the valve as soon as cross head 44 has been raised sufficiently. Moisture on the block of butter makes the paper stick better for the wrapping operation as well as distributing itself over the surface of the butter, and thus giving to the block water to take the place of that which may have been partly removed by the compressing operation.

While I have described the best form of my invention now known to me, it is evident that many changes may be made therein without departing from the spirit thereof. For instance, the wrapping mechanisms in both modifications may, by a suitable change in the surfaces of the cams and in the position of the crank arms, be operated by a rotating shaft 86 or 164 instead of an oscillating shaft. I desire to cover by the annexed claims all such modifications within the scope of my invention.

What I claim is:

1. In a machine of the character described, means for forming material to be operated upon into blocks comprising in combination a chamber, a hopper supplying material to the chamber, a suitable opening in said chamber, means for separating the charge in the chamber from the material in the hopper and for extruding the material confined in the chamber from the opening comprising a piston and a separating knife in advance of said piston, and automatic means for cutting off predetermined amounts of said extruded material.

2. In a machine of the character described, means for forming material to be operated upon into blocks comprising in combination a chamber, means for supplying material to the chamber, an opening of suitable shape in said chamber, a piston in said chamber for extruding the material from said opening, and means comprising a cutting edge for separating the charge in the chamber from the material to be supplied to it upon the extruding stroke of the piston, and automatic means for cutting off predetermined amounts of said extruded material.

3. In a machine of the character described, means for forming the material to be operated upon into blocks comprising in combination a chamber, means for supplying material to the chamber, an opening of suitable shape in said chamber, a piston in said chamber for extruding the material from said opening, means connected with said piston for separating the charge in the chamber from the material to be supplied to it upon the extruding stroke of the piston, and automatic means for cutting off predetermined amounts of said extruded material.

4. In a machine of the character described, means for forming material to be operated upon into blocks, comprising in combination a rectangular hopper for supplying material to the chamber, a piston in said chamber for extruding material through a suitable opening, and a knife-like projection on said piston for separating the charge within the chamber from the material being supplied to the chamber, and automatic means for cutting off predetermined amounts of said material.

5. In a machine of the character described, means for forming material to be operated upon into blocks, comprising in combination a chute through which material is discharged, said chute having side walls which converge toward each other and toward the mouth of the chute at a greater angle than the top and bottom walls thereof, means for forcing material through the chute, and means for intermittently severing the material discharged from the mouth of the chute.

6. In a machine of the character described, means for forming material to be operated upon into blocks, comprising in combination a chute having walls converging toward the discharge end thereof, the side walls converging at a greater angle than the bottom walls thereof, and the bottom and top walls converging at a greater angle at the inlet end of the chute than they do at a point nearer the other end thereof, means for forcing material through said chute, and automatic means for cutting off predetermined amounts of material discharged from the mouth of said chute.

7. In a machine of the character described, means for forming material to be operated upon into blocks comprising in combination a chute having walls converging toward the discharge end thereof, and the walls immediately adjacent the discharge end of the chute parallel to each other, means for forcing material to the chute, and means for automatically cutting off predetermined amounts of said material.

8. In a machine of the character described, means for forming material to be operated upon into blocks comprising in combination means for extruding material to be operated upon as a bar of suitable shape upon a receiving table, and means operated by the projection of the bar across the table for automatically severing the same into sections of suitable lengths from the end of the chute.

9. In a machine of the character described, means for forming material into bars of suitable shape, a collapsible table on which the bar is projected, means operated by the projection of the bar across the table for severing it into suitable lengths, and means beneath the table for receiving the severed part of the bar.

10. In a machine of the character described, means for forming material to be operated upon into blocks comprising means for forming the material into bars of suitable shape, a centrally collapsible table formed in two adjacent pivoted sections adapted to be operated by the weight of the bar to collapse the table, means operated by the projection of the bar across the table for severing it into suitable lengths, and means beneath the table for receiving the severed lengths.

11. In a machine of the character described, means for extruding the material to be operated upon through an opening of suitable shape, means adjacent the opening for severing portions of the extruded material, and means operated directly by the projection of the material from the opening for automatically controlling the severing means.

12. In a machine of the character described, means for extruding the material to be operated upon through an opening, means adjacent the opening for cutting off suitable portions of the extruded material, and an abutment fixed in a position to be engaged by the material projecting from the opening prior to its being cut off.

13. In a machine of the character described, means for extruding material to be operated upon from a suitable opening, a cutting device adjacent the said opening, and means comprising a plate engaged by the material projected from the opening for automatically controlling the cutting device.

14. In a machine of the character described, means for extruding the material to be operated upon through a suitable opening, a reciprocating cutting device adjacent the end of the chute, and means automatically operated directly by the material projected from the opening for controlling the said cutting device.

15. In a machine of the character described, means for extruding the material to be operated upon through an opening of suitable shape, a weighted cutting device held in a raised position adjacent the opening by a latch, and means operated by the material projected from the opening for operating the latch to release the said cutting device.

16. In a machine of the character described, means for forcing the material to be operated upon through a suitable opening, gravity operated means adjacent the opening for cutting the material projected from the opening into suitable lengths, means operated by the material projected from the opening for causing an operating stroke of the cutting device, and means for resetting the said device set into operation during its downward stroke.

17. In a machine of the character described, a cutting device normally held in a position by suitable holding means, means for projecting material to be operated upon into operative relation to said cutting device, means controlled by the projected material for controlling the working stroke of said cutting device, and means controlled by the said cutting device in its working stroke for automatically resetting the same.

18. In a machine of the character described, a cutting device, means for projecting material to be operated upon into operative relation to the device, an abutment in the path of the projected material which controls the cutting device, and means connected with the cutting device and operated during its working stroke for moving the said abutment away from the end of said projected material.

19. In a machine of the character described, a cutting device, means for projecting material to be operated upon into operative relation with said cutting device, an abutment in the path of said projecting material for controlling said cutting device, and a cam surface on said cutting device for automatically moving said abutment away from the projecting end of said material upon the working stroke of said device.

20. In a machine of the character described, means for forming the material to be operated upon into blocks comprising a chamber, means for feeding material into the chamber, an opening in the chamber, and a piston for forcing the material through said opening to form charges of predetermined size, means operative upon the discharge of a body of material of the required size to reverse the piston, and means operative upon the emptying of the piston chamber on the forcing stroke to reverse the piston.

21. In a machine of the character described, means for forming material to be operated upon into blocks of predetermined size, and automatic means preventing the formation of blocks of a size smaller than the predetermined size.

22. In a machine of the character described, means for feeding the material to be operated upon, a table for receiving the material from the feeding means, and automatic means which moistens the material as it reaches the table.

In testimony whereof I have hereunto set my hand in presence of two subscribing witnesses.

ROBERT O. HUGHES.

Witnesses:
BENNETT WILLIAMS,
W. R. GEDDES.